("(12) United States Patent" ...)

United States Patent
Maekawa et al.

(10) Patent No.: US 10,402,016 B2
(45) Date of Patent: Sep. 3, 2019

(54) OPTICAL OPERATING INPUT DETECTION APPARATUS, AUTOMATIC VENDING MACHINE, AND OPTICAL OPERATING INPUT DETECTION METHOD

(71) Applicant: FUJI ELECTRIC CO., LTD., Kawasaki (JP)

(72) Inventors: Tomonori Maekawa, Yokkaichi (JP); Shinichi Kobayashi, Mie (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 157 days.

(21) Appl. No.: 15/333,706

(22) Filed: Oct. 25, 2016

(65) Prior Publication Data
US 2017/0038861 A1    Feb. 9, 2017

Related U.S. Application Data

(63) Continuation of application No. PCT/JP2015/063850, filed on May 14, 2015.

(30) Foreign Application Priority Data

May 29, 2014  (JP) .................. 2014-111765
Nov. 13, 2014  (JP) .................. 2014-230951

(51) Int. Cl.
*G06F 3/042* (2006.01)
*G07F 9/00* (2006.01)
*G06F 3/041* (2006.01)

(52) U.S. Cl.
CPC ............ *G06F 3/042* (2013.01); *G06F 3/0416* (2013.01); *G06F 3/0421* (2013.01); *G07F 9/00* (2013.01); *G06F 2203/04108* (2013.01)

(58) Field of Classification Search
CPC ............................. G06F 3/042; G06F 3/0421
See application file for complete search history.

(56) References Cited

U.S. PATENT DOCUMENTS

| 6,100,538 A | 8/2000 | Ogawa |
| 6,441,362 B1 | 8/2002 | Ogawa |

(Continued)

FOREIGN PATENT DOCUMENTS

| JP | 11-3170 | 1/1999 |
| JP | 11-232537 | 8/1999 |

(Continued)

OTHER PUBLICATIONS

International Search Report dated Jun. 30, 2015 in corresponding International Application No. PCT/CN2015/063850.

*Primary Examiner* — Roy P Rabindranath

(57) ABSTRACT

An optical operating input detection apparatus includes: a detection unit configured to optically detect an operating input by the operating unit on respective first and second detection layers, the first detection layer extending in parallel with a display area surface on the display panel to be spaced a predetermined distance away from the display area surface and having a surface area including the display area surface, the second detection layer being disposed between the display area surface and the first detection layer and having a surface area identical to the surface area of the first detection layer; and an operation determination unit configured to determine operating detail of the operating unit based on a detected image on the respective first and second detection layers.

12 Claims, 19 Drawing Sheets

(56) References Cited

U.S. PATENT DOCUMENTS

| | | | |
|---|---|---|---|
| 2010/0053079 A1* | 3/2010 | Kwon | G06F 3/0386 345/156 |
| 2010/0097391 A1* | 4/2010 | Ahn | G06F 3/0412 345/589 |
| 2011/0050648 A1* | 3/2011 | Lee | G06F 3/0412 345/175 |
| 2013/0009914 A1 | 1/2013 | Kano et al. | |
| 2014/0118270 A1* | 5/2014 | Moses | G06F 3/041 345/173 |

FOREIGN PATENT DOCUMENTS

| | | |
|---|---|---|
| JP | 2002-149329 | 5/2002 |
| JP | 2003-44223 | 2/2003 |
| JP | 2004-54065 | 2/2004 |
| JP | 2005-352756 | 12/2005 |
| JP | 2006-260474 | 9/2006 |
| JP | 2009-289084 | 12/2009 |
| JP | 2011-203861 | 10/2011 |
| JP | 2013-88936 | 5/2013 |
| JP | 2014-52696 | 3/2014 |

* cited by examiner

OPTICAL OPERATING INPUT DETECTION APPARATUS, AUTOMATIC VENDING MACHINE, AND OPTICAL OPERATING INPUT DETECTION METHOD

CROSS-REFERENCE TO RELATED APPLICATIONS

This application is a continuation of PCT International Application No. PCT/JP2015/063850 filed on May 14, 2015 which designates the United States, incorporated herein by reference, and which claims the benefit of priority from Japanese Patent Application No. 2014-111765 filed on May 29, 2014 and Japanese Patent Application No. 2014-230951 filed on Nov. 13, 2014, incorporated herein by reference.

BACKGROUND

1. Technical Field

The disclosure relates to an optical operating input detection apparatus, an automatic vending machine, and an optical operating input detection method.

2. Related Art

A late automatic vending machine model includes a display that is incorporated in a front door thereof and that displays commodity samples as an image and, for example, a touch panel that allows a specific commodity to be selected (see Japanese Patent Application Laid-open No. 11-232537). The use of the display and the touch panel can promote expansion of the automatic vending machines.

Japanese Patent Application Laid-open No. 2009-289084 discloses, as exemplary types of touch panels, a capacitive coupling type, an optical type, and an ultrasonic type. Japanese Patent Application Laid-open No. 2014-52696 discloses a technique that uses a detection reference set in advance for each predetermined position within a detection surface, to thereby detect the position of a pointing device that contacts or is brought close to the detection surface.

Japanese Patent Application Laid-open No. 2004-54065 discloses an arrangement relating to position detection by light beam interruption. The arrangement includes an optical sensor on one edge of a detection area and a thin retroreflector frame on the other edge of the detection area. The optical sensor emits and receives light. To reduce effect of ambient light, the arrangement disclosed in Japanese Patent Application Laid-open No. 2004-54065 flashes off and on the light source to thereby take a difference in signals between when the light source is on and when the light source is off.

For the purpose of finding position coordinates of a pointing device that emits radiated light directly or indirectly on a coordinate surface, Japanese Patent Application Laid-open No. 11-3170 discloses an arrangement that includes a detection unit, an optical unit, and a shielding unit. More specifically, the detection unit is disposed around the coordinate surface. The detection unit receives the radiated light and converts the radiated light to a corresponding electric signal. The optical unit limits a field of view of the detection unit to a predetermined height or lower from the coordinate surface to thereby collimate a range of the radiated light to be received with respect to the coordinate surface. The shielding unit may, for example, be a shielding frame that is disposed so as to surround the coordinate surface and that removes unwanted light other than the radiated light from the field of view.

SUMMARY

Techniques employed in known touch panels to detect an operating unit, such as a human finger, are concerned with only one stage at which a touch panel screen is touched. As a result, the known touch panels are not free from false operations involved in the operating unit erroneously touching the touch panel screen during selection of a specific position by the operating unit.

In view of the foregoing, it is desirable to provide an optical operating input detection apparatus, an automatic vending machine, and an optical operating input detection method capable of inhibiting an occurrence of false operations on the touch panel.

According to an aspect of the present disclosure, an optical operating input detection apparatus for optically detecting an operating input on a display panel by an operating unit. The optical operating input detection apparatus includes: a detection unit configured to optically detect an operating input by the operating unit on respective first and second detection layers, the first detection layer extending in parallel with a display area surface on the display panel to be spaced a predetermined distance away from the display area surface and having a surface area including the display area surface, the second detection layer being disposed between the display area surface and the first detection layer and having a surface area identical to the surface area of the first detection layer; and an operation determination unit configured to determine operating detail of the operating unit based on a detected image on the respective first and second detection layers.

According to another aspect of the present disclosure, an automatic vending machine includes an optical operating input detection apparatus optically detecting an operating input on a display panel by an operating unit. The optical operating input detection apparatus includes: a detection unit configured to optically detect an operating input by the operating unit on respective first and second detection layers, the first detection layer extending in parallel with a display area surface on the display panel to be spaced a predetermined distance away from the display area surface and having a surface area including the display area surface, the second detection layer being disposed between the display area surface and the first detection layer and having a surface area identical to the surface area of the first detection layer; and an operation determination unit configured to determine operating detail of the operating unit based on a detected image on the respective first and second detection layers. The detection unit is disposed on an exterior door of the automatic vending machine.

According to still another aspect of the present disclosure, an optical operating input detection method for optically detecting an operating input on a display panel by an operating unit. The optical operating input detection method includes: optically detecting an operating input by the operating unit on respective first and second detection layers, the first detection layer extending in parallel with a display area surface on the display panel to be spaced a predetermined distance away from the display area surface on the display panel and having a surface area including the display area surface, the second detection layer being disposed between the display area surface and the first detection layer and having a surface area identical to the surface area of the first detection layer; and determining operating detail of the operating unit based on a detected image on the respective first and second detection layers.

The above and other objects, features, advantages and technical and industrial significance of this invention will be better understood by reading the following detailed description of presently preferred embodiments of the invention, when considered in connection with the accompanying drawings.

DETAILED DESCRIPTION

The following describes modes for carrying out the invention with reference to the accompanying drawings.

Overview of Optical Operating Input Detection Apparatus

Figure 1:
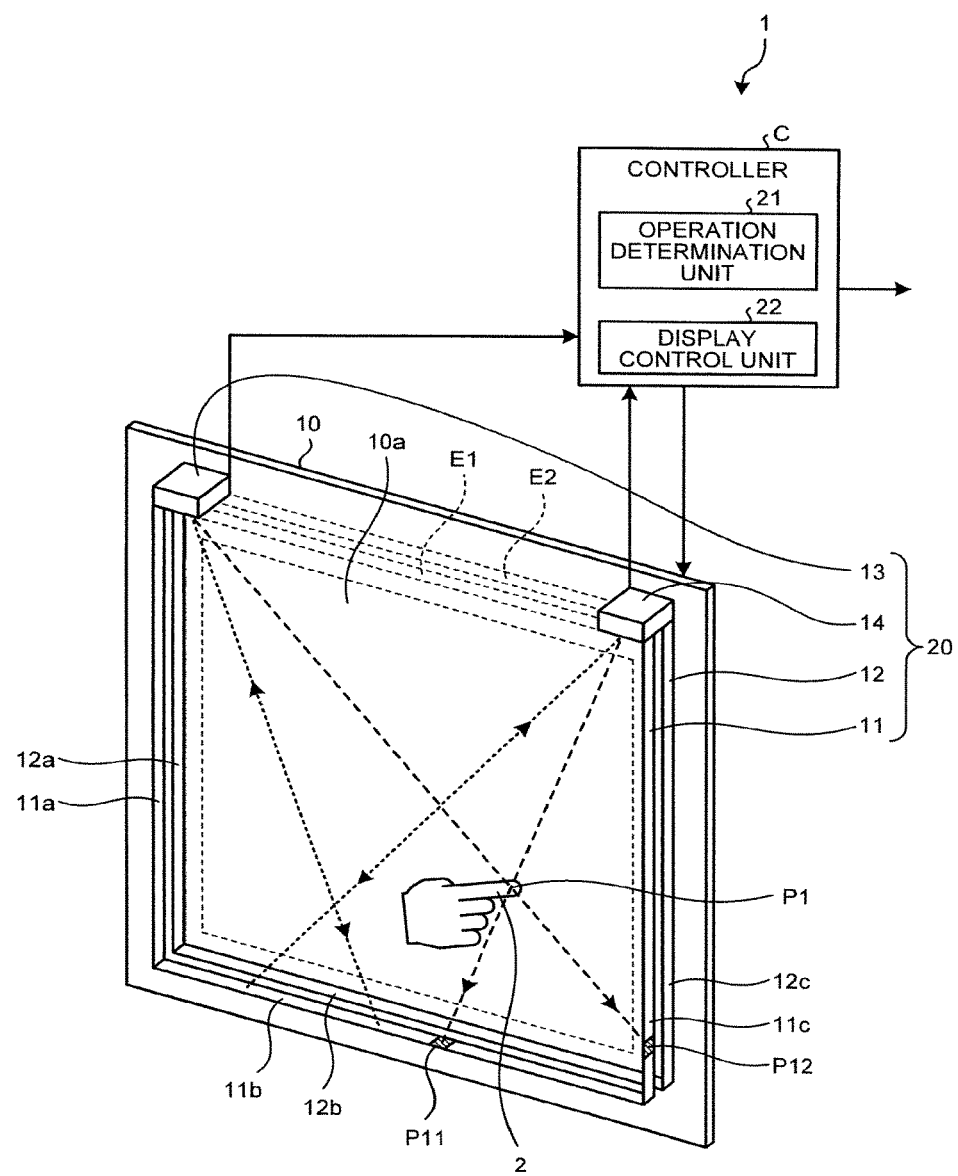
FIG. 1 is a schematic diagram illustrating a configuration of an optical operating input detection apparatus according to the present disclosure.
Figure 2:
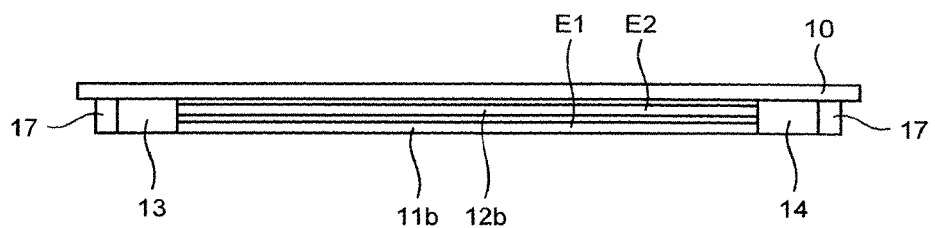
FIG. 2 is a plan view illustrating a detection unit of the optical operating input detection apparatus illustrated in FIG. 1.

FIG. 1 is a schematic diagram illustrating a configuration of an optical operating input detection apparatus 1 according to the present disclosure. FIG. 2 is a plan view illustrating a detection unit 20 of the optical operating input detection apparatus 1 illustrated in FIG. 1. As illustrated in FIG. 1, the detection unit 20 is disposed on a surface of a display panel 10 having a display area surface 10a and functions as an optical touch panel.

The detection unit 20 includes a rectangular first detection layer E1 and a rectangular second detection layer E2. More specifically, the first detection layer E1 extends in parallel with, and is spaced a predetermined distance away from, the display area surface 10a on the display panel 10 and has a surface area including the display area surface 10a. The second detection layer E2 is disposed between the display area surface 10a and the first detection layer E1 and has a surface area identical to the surface area of the first detection layer E1.

The first detection layer E1 includes a retroreflector 11 disposed on right and left edges and a lower edge of the surface area thereof. The second detection layer E2 includes a retroreflector 12 disposed on right and left edges and a lower edge of the surface area thereof. In addition, a left detector 13 and a right detector 14 are disposed at left ends of upper edges and right ends of the upper edges, respectively, of the surface areas defined by the first detection layer E1 and the second detection layer E2. The left detector 13 uses a left infrared ray irradiation part to irradiate right edge areas 11c and 12c and lower edge areas 11b and 12b of the retroreflectors 11 and 12, respectively, with infrared rays and uses a left infrared ray detection part to receive infrared ray reflection light from right edge areas 11c and 12c and the lower edge areas 11b and 12b, respectively, of the retroreflectors 11 and 12, to thereby acquire images of the right edge areas 11c and 12c and the lower edge areas 11b and 12b. The right detector 14 uses a right infrared ray irradiation part to irradiate left edge areas 11a and 12a and the lower edge areas 11b and 12b of the retroreflectors 11 and 12, respectively, with infrared rays and uses a right infrared ray detection part to receive infrared ray reflection light from left edge areas 11a and 12a and the lower edge areas 11b and 12b, respectively, of the retroreflectors 11 and 12, to thereby acquire images of the left edge areas 11a and 12a and the lower edge areas 11b and 12b. It is noted that the left infrared ray irradiation part and the right infrared ray irradiation part can each be achieved, for example, by an infrared ray LED and the left infrared ray detection part and the right infrared ray detection part can each be achieved, for example, by an infrared ray image sensor. The left detector 13 and the right detector 14 may use a type of light other than infrared rays.

Figure 3:
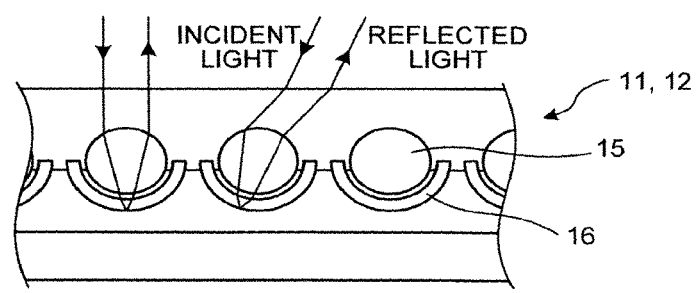
FIG. 3 is a cross-sectional view illustrating a configuration of a retroreflector.

The retroreflectors 11 and 12 are each stripe-shaped tape. The retroreflectors 11 and 12 are disposed on the inside of a frame 17 illustrated in FIG. 2. It is noted that the frame 17 is omitted in FIG. 1. As illustrated in FIG. 3, the retroreflectors 11 and 12 each reflect, as reflected light, incident light of infrared rays emitted at all times from the left detector 13 and the right detector 14 back on a path parallel to the incident rays. The retroreflectors 11 and 12 each specifically include, as illustrated in FIG. 3, a plurality of micro-glass beads 15, each forming a glass ball, scattered planarly over the surface and a reflective film 16 disposed on undersides of the glass beads 15.

A controller C is connected with the left detector 13, the right detector 14, and the display panel 10. The controller C is also connected with an external device not illustrated. The controller C includes an operation determination unit 21 and a display control unit 22. The operation determination unit 21 determines specific operation detail of an operating unit 2 on the basis of detected images of the operating unit 2 on the first detection layer E1 and the second detection layer E2. When, for example, having detected the operating unit 2 on the first detection layer E1 and the operating unit 2 on the second detection layer E2 at a planar position identical to a planar position detected the operating unit 2 on the first detection layer E1, the operation determination unit 21 determines that a contact operation has been performed by the operating unit 2 with respect to a surface of the display panel 10 at the planar position. The operation determination unit 21 identifies a coordinate position of the detected operating unit 2.

The display control unit 22 performs display processing on the display panel 10 in accordance with the operation detail determined by the operation determination unit 21. The display control unit 22, when having detected the operating unit 2 on the first detection layer E1, for example, displays, on the display panel 10, an image indicative of a position on the first detection layer E1 at which the operating unit 2 points, e.g., a mouse pointer, such that the mouse pointer follows the movement of the operating unit 2. When the operating unit 2 is detected on the first detection layer E1, the display control unit 22 displays, on the display panel 10, information that is defined in advance to correspond to the position of the operating unit 2 on the first detection layer E1.

When the contact operation has been performed by the operating unit 2, the operation determination unit 21 may determine, as a decision-making operation by which a specific commodity, for example, has been selected, the operation detail corresponding to the position at which the contact operation has been performed. Specifically, the operation determination unit 21 may determine the contact operation performed by the operating unit 2 as the operation detail or determine the decision-making operation corresponding to the contact operation as the operation detail. The controller C transmits the contact operation or the decision-making operation determined by the operation determination unit 21 to the display control unit 22 or the external device not illustrated.

The determination of the decision-making operation made by the operation determination unit 21 or the external device may even be made when the condition of the contact operation lasts for a predetermined period of time. Alternatively, the determination of the decision-making operation may still be made when, for example, a contact operation is performed on a new decision-making confirmation screen involved with the contact operation. This decision-making confirmation screen represents, for example, a guidance display screen for confirmation of the selection of a commodity. The guidance display screen displays area screens indicating "Yes" and "No", together with a message stating "Do you want to buy this commodity?". The operation determination unit 21 or the external device determines that the decision-making operation has been performed when a contact operation is performed with respect to the area screen indicating "Yes". The operation determination unit 21 or the external device may alternatively determine that the decision-making operation has been performed when the contact operation is performed continuously within a predetermined period of time, specifically, when a double-clicking operation is performed.

Detection Operation by Detection Unit

Figure 4:
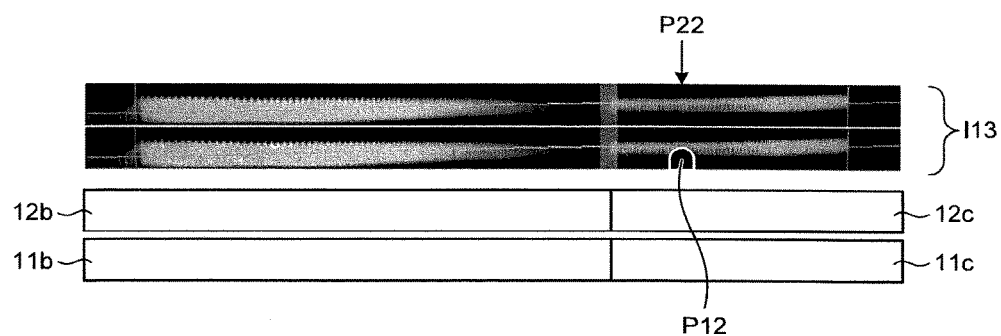
FIG. 4 is a diagram illustrating an exemplary image detected by a left detection unit.
Figure 5:
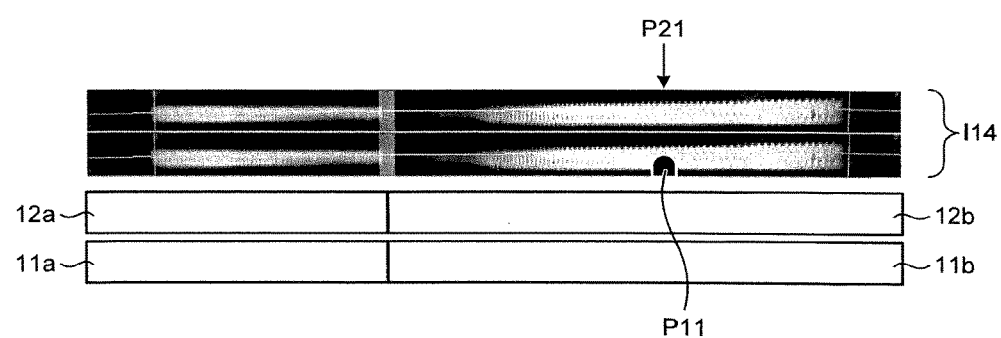
FIG. 5 is a diagram illustrating an exemplary image detected by a right detection unit.

As illustrated in FIG. 1, the left detector 13 and the right detector 14 irradiate the entire surfaces of the first detection layer E1 and the second detection layer E2, respectively, with infrared rays. The emitted infrared rays are reflected by the retroreflectors 11 and 12 and returned as reflected light to the left detector 13 and the right detector 14. When the operating unit 2 exists at the first detection layer E1 or the second detection layer E2, the emitted infrared rays are blocked by the operating unit 2 and do not reach the retroreflector 11 or 12. Thus, the reflected light from the retroreflectors 11 and 12 does not exist at a portion at which the operating unit 2 exists. Assume that the operating unit 2 exists at a position P1 of the first detection layer E1 as illustrated, for example, in FIG. 1. Then, a shadow P12 is created in the right edge area 11c of the retroreflector 11 and a shadow P11 is created in the lower edge area 11b of the retroreflector 11. Specifically, as illustrated in FIG. 4, the left detector 13 acquires an image I13 that has the shadow P12 in the right edge area 11c of the retroreflector 11. Additionally, as illustrated in FIG. 5, the right detector 14 acquires an image I14 that has the shadow P11 in the lower edge area 11b of the retroreflector 11.

The operation determination unit 21 translates positions of the detected images I13 and I14 to corresponding coordinates positions of the first detection layer E1, thereby finding the position of the operating unit 2 existing on the first detection layer E1 using triangular surveying, such as the method of forward intersection. It should be noted that, when the operating unit 2 reaches the second detection layer E2 beyond the first detection layer E1, a shadow is created at each of positions P22 and P21 in the respective images I13 and I14 as illustrated in FIGS. 4 and 5.

Optical Input Operation Detection Processing by Controller

Figure 6:
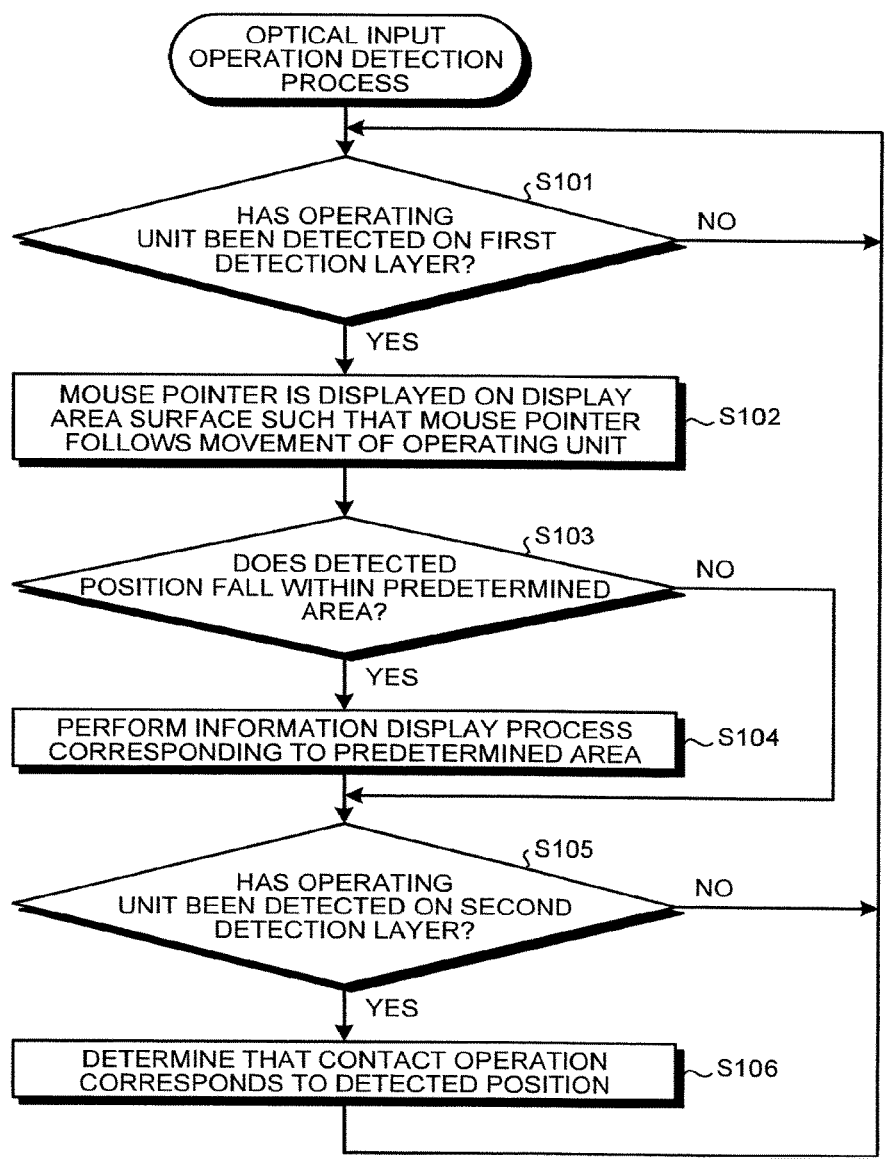
FIG. 6 is a flowchart illustrating an optical input operation detection process performed by a controller.

FIG. 6 is a flowchart illustrating an optical input operation detection process performed by the controller C. The following process assumes that the display panel 10 is a liquid crystal panel. The liquid crystal panel is disposed on an exterior door of an automatic vending machine for use in selling, for example, beverages. The detection unit 20 described previously is disposed on a front surface of the liquid crystal panel so as to surround a display area of the liquid crystal panel.

Figure 7:
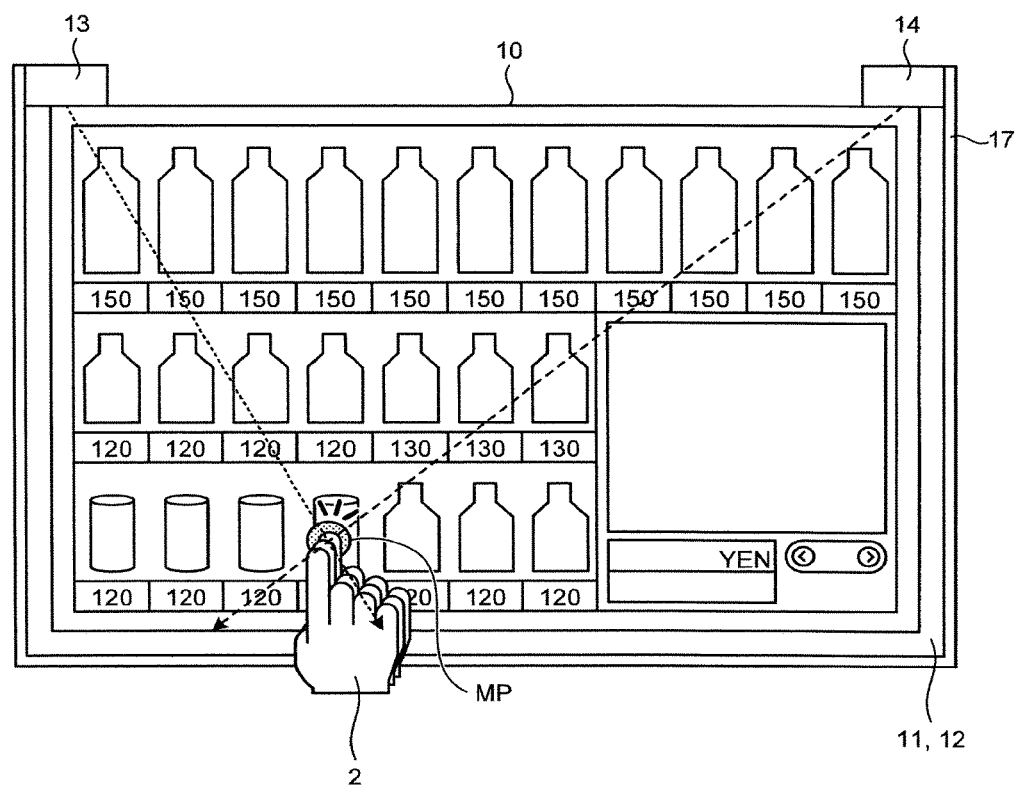
FIG. 7 is a diagram illustrating an exemplary display of a mouse pointer through detection of an operating unit on a first detection layer.
Figure 8:
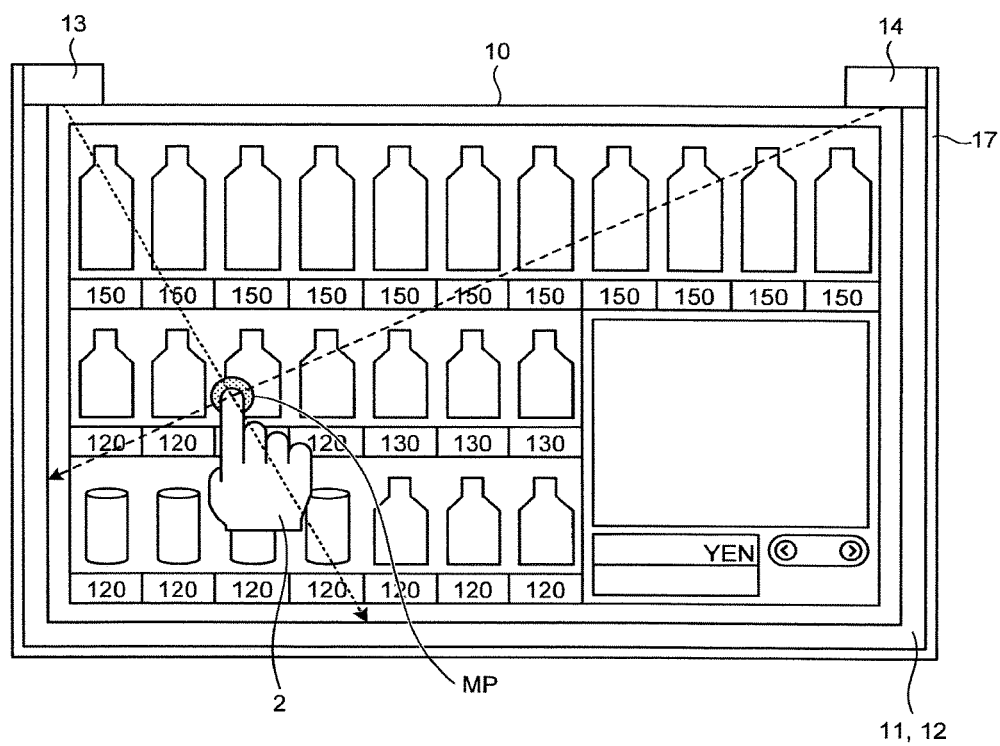
FIG. 8 is a diagram illustrating an exemplary display of the mouse pointer illustrated in FIG. 7, following movement.
Figure 9:
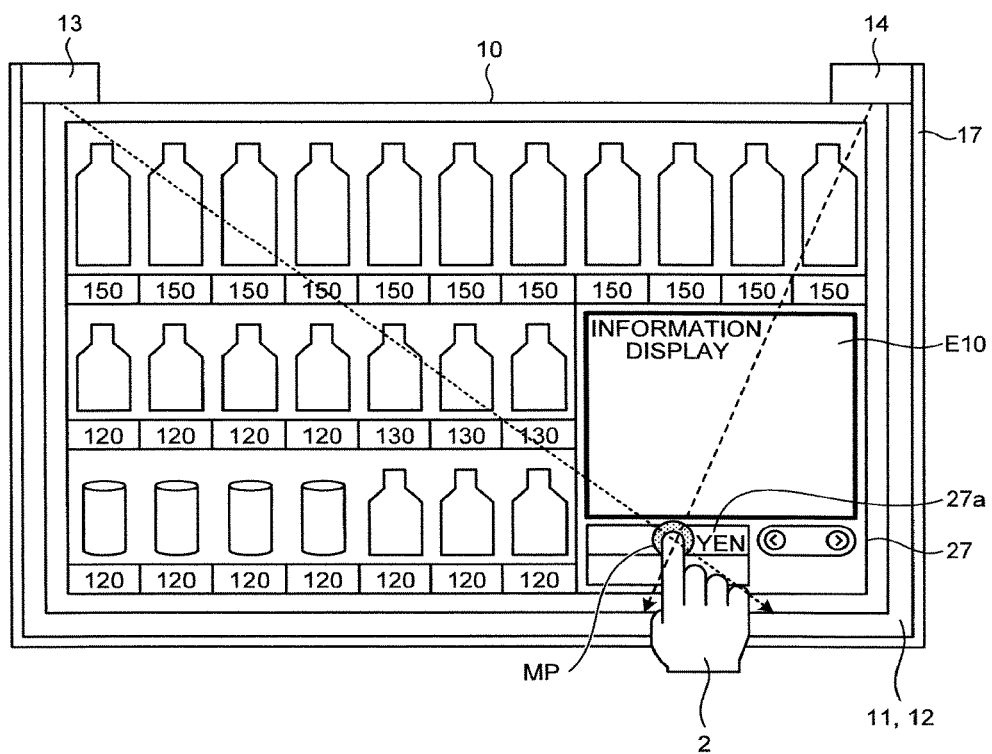
FIG. 9 is a diagram illustrating an exemplary display associated with a predetermined area through detection of the operating unit on the first detection layer.
Figure 10:
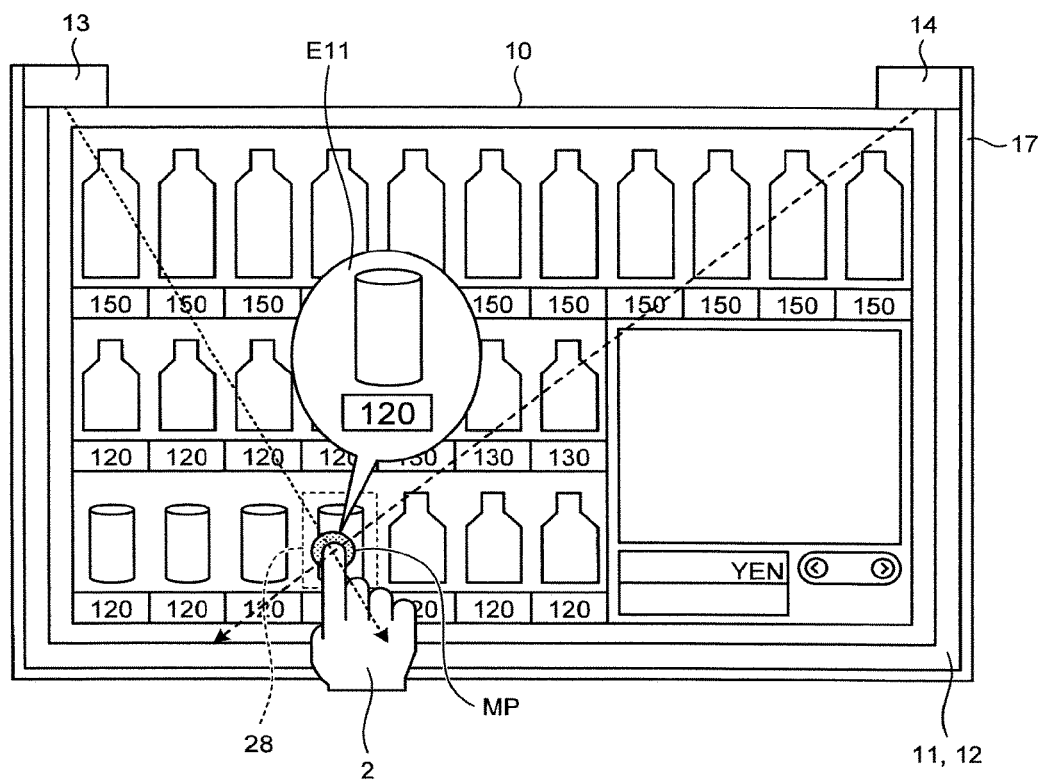
FIG. 10 is a diagram illustrating an exemplary display associated with the predetermined area through the detection of the operating unit on the first detection layer.

Reference is made to FIG. 6. The operation determination unit 21 determines whether the operating unit 2 has been detected on the first detection layer E1 (Step S101). If it is determined that the operating unit 2 has been detected on the first detection layer E1 (Yes at Step S101), the display control unit 22 displays a circular image as a mouse pointer MP at the position of the operating unit 2 detected on the display area surface 10a of the display panel 10 such that the mouse pointer MP follows the movement of the operating unit 2 (Step S102) as illustrated in FIG. 7 and FIG. 8. The display control unit 22 thereafter determines whether the detected position of the operating unit 2 falls within a predetermined area (Step S103). If it is determined that the detected position of the operating unit 2 falls within the predetermined area (Yes at Step S103), an information display process corresponding to the predetermined area is performed (Step S104). For example, as illustrated in FIG. 9, the predetermined area is an area 27a of an information display portion 27. When the operating unit 2 is located at the area 27a, information such as a preset image or video is displayed on an information display area E10. Additionally, as illustrated in FIG. 10, the predetermined area is an area 28 displaying a commodity. When the operating unit 2 is disposed within the area 28, the commodity is displayed in an enlarged view within an area E11 inside a balloon. Preferably, the enlarged view is displayed when the operating unit 2 stays inside the area 28 for a predetermined period of time. If it is determined that the detected position of the operating unit 2 does not fall within the predetermined area (No at Step S103), the process proceeds to Step S105.

Figure 11:
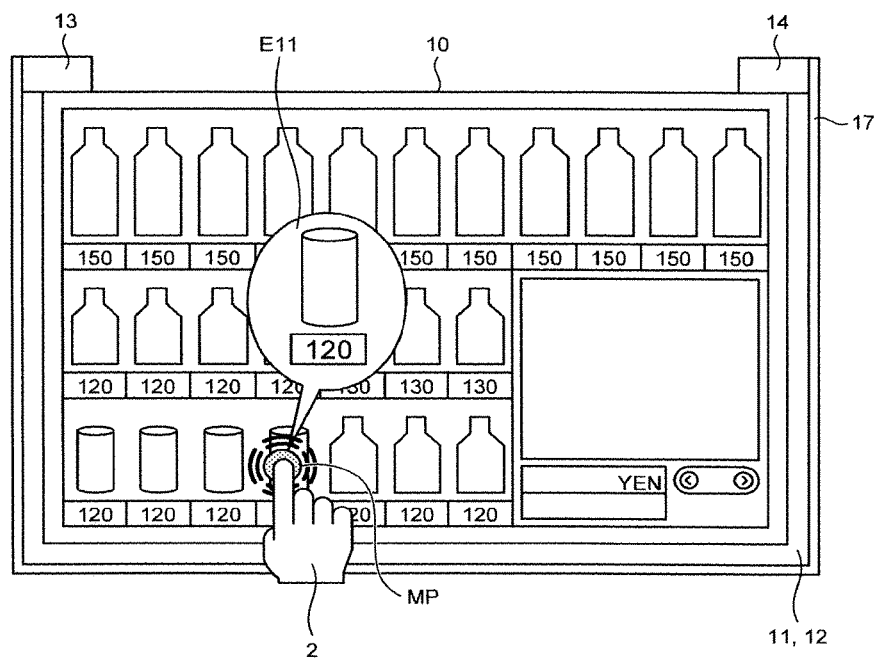
FIG. 11 is a diagram illustrating an exemplary display of highlighting the mouse pointer through the detection of the operating unit on a second detection layer.

Thereafter, the operation determination unit 21 determines whether the operating unit 2 has been detected on the second detection layer E2 (Step S105). If it is determined that the operating unit 2 has been detected on the second detection layer E2 (Yes at Step S105), the operation determination unit 21 determines that the contact operation corresponding to the detected position at which the mouse pointer MP is displayed has been performed as illustrated in FIG. 11. Additionally, the display control unit 22 highlights the mouse pointer MP (Step S106) and transmits the operation detail of the contact operation to the controller C of the automatic vending machine, before the process proceeds to Step S101. If it is determined that the operating unit 2 has not been detected on the first detection layer E1 (No at Step S101) and that the operating unit 2 has not been detected on the second detection layer E2 (No at Step S105), the process is proceeded to Step S101 and the above-described process is repeated. It should be noted that, as described previously, the contact operation may be determined as the decision-making operation.

The present embodiment employs a two-stage detection approach on the basis of the distance from the display panel 10. Specifically, when the operating unit 2 is detected on the first detection layer E1, the mouse pointer MP is displayed to follow the position currently selected by the operating unit 2 for confirmation and, when the operating unit 2 is detected on the second detection layer E2, the contact operation corresponding to the current position of the mouse pointer MP is determined to have been performed. This approach reduces faulty operations by the operating unit 2. It is to be noted that the operation when the operating unit 2 is detected on the first detection layer E1 corresponds to the display and following movement of the mouse pointer MP in a screen of an ordinary information processing apparatus and the operation when the operating unit 2 is detected on the second detection layer E2 corresponds to clicking of the mouse (decision-making operation) of an ordinary information processing apparatus.

Figure 12:
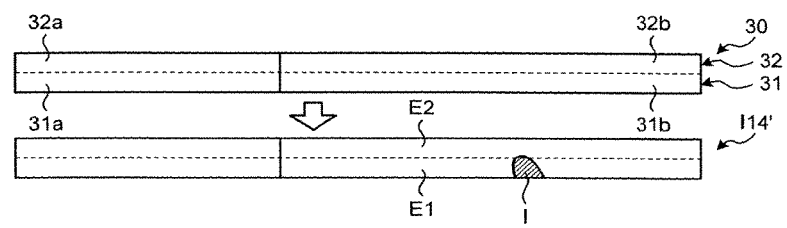
FIG. 12 is a diagram illustrating a configuration of a single retroreflector.

Reference is made to FIG. 12. A single retroreflector 30 may take the place of the two retroreflectors 11 and 12. In this case, the above-described process may be performed by a configuration that includes two retroreflectors 31 and 32 to correspond to the retroreflectors 11 and 12, respectively. The two retroreflectors 31 and 32 adjoin each other. For example, as illustrated in FIG. 12, left edge areas 32a and 31a are associated with the left edge areas 12a and 11a and lower edge areas 32b and 31b are associated with the lower edge area 12b and 11b.

It is here noted that, when the two retroreflectors 11 and 12 are used, the shadows P11 and P12 of the acquired images are perceived as points in a length direction. Having the single retroreflector 30, on the other hand, allows an image I14' including a planar shadow I to be obtained as illustrated in FIG. 12. Thus, the use of the single retroreflector 30 enables the operation determination unit 21 to perform software processing to thereby identify any desired operating unit 2, e.g., a human finger on the basis of, for example, a shape, orientation, and movement of the shadow. This approach allows the desired operating unit 2 to be distinguished from any object other than the operating unit 2, such as dust or dirt. This distinction process can be applied to the configuration incorporating two retroreflectors 11 and 12.

Alternatively, infrared ray image sensors may be disposed, in place of the retroreflectors 11 and 12, at the positions of the retroreflectors 11 and 12 to acquire images.

Retroreflectors

The retroreflectors 11 and 12 described above each include the glass beads 15. The retroreflectors 11 and 12 may even be achieved by using a group of densely and planarly disposed corner cube prisms. In the planar disposition, preferably, a light incidence surface and a light emission surface of a triangle of each corner cube prism are densely disposed. The corner cube prism is a triangular pyramid that combines three right angles and functions to return the reflected light back on a path parallel to the incident rays.

Detected Image Output Control Process Including Nullification of Strong Extraneous Incident Light It is noted that, preferably, the detected image represents a result of detection of only infrared rays irradiated by the left infrared ray irradiation part and the right infrared ray irradiation part of the left detector 13 and the right detector 14, respectively. Detection made by the left infrared ray detection part and the right infrared ray detection part of light other than the infrared rays irradiated by the left infrared ray irradiation part and the right infrared ray irradiation part may cause false detection of the operating unit 2 to occur due to the light other than the infrared rays irradiated by the left infrared ray irradiation part and the right infrared ray irradiation part acting as noise. The extraneous light reflected by the retroreflector and incident upon the sensor, in particular, can cause an adverse effect to invite false detection.

To prevent the above from occurring, the left detector 13 and the right detector 14 generate difference-processed images. More specifically, the left infrared ray irradiation part and the right infrared ray irradiation part each turn on and off the infrared light, and an image generated when the infrared light irradiated by each of the left infrared ray irradiation part and the right infrared ray irradiation part is turned off is subtracted from an image generated when the infrared light is irradiated by each of the left infrared ray irradiation part and the right infrared ray irradiation part and a difference-processed image is thereby generated. The difference-processed images thus generated serve as the detected images.

When strong extraneous incident light is present in the image generated when the left infrared ray irradiation part and the right infrared ray irradiation part turn off the infrared light, the area in which the strong extraneous incident light is present is a saturated bright area having maximum luminance. Thus, when the strong extraneous incident light is present, the portion corresponding to the bright area within the difference-processed image is a shadow area having a low luminance level, so that false detection involving a shadow created by the operating unit 2 may result. Thus, preferably, the image of the portion corresponding to the bright area is subjected to nullification.

Figure 13:
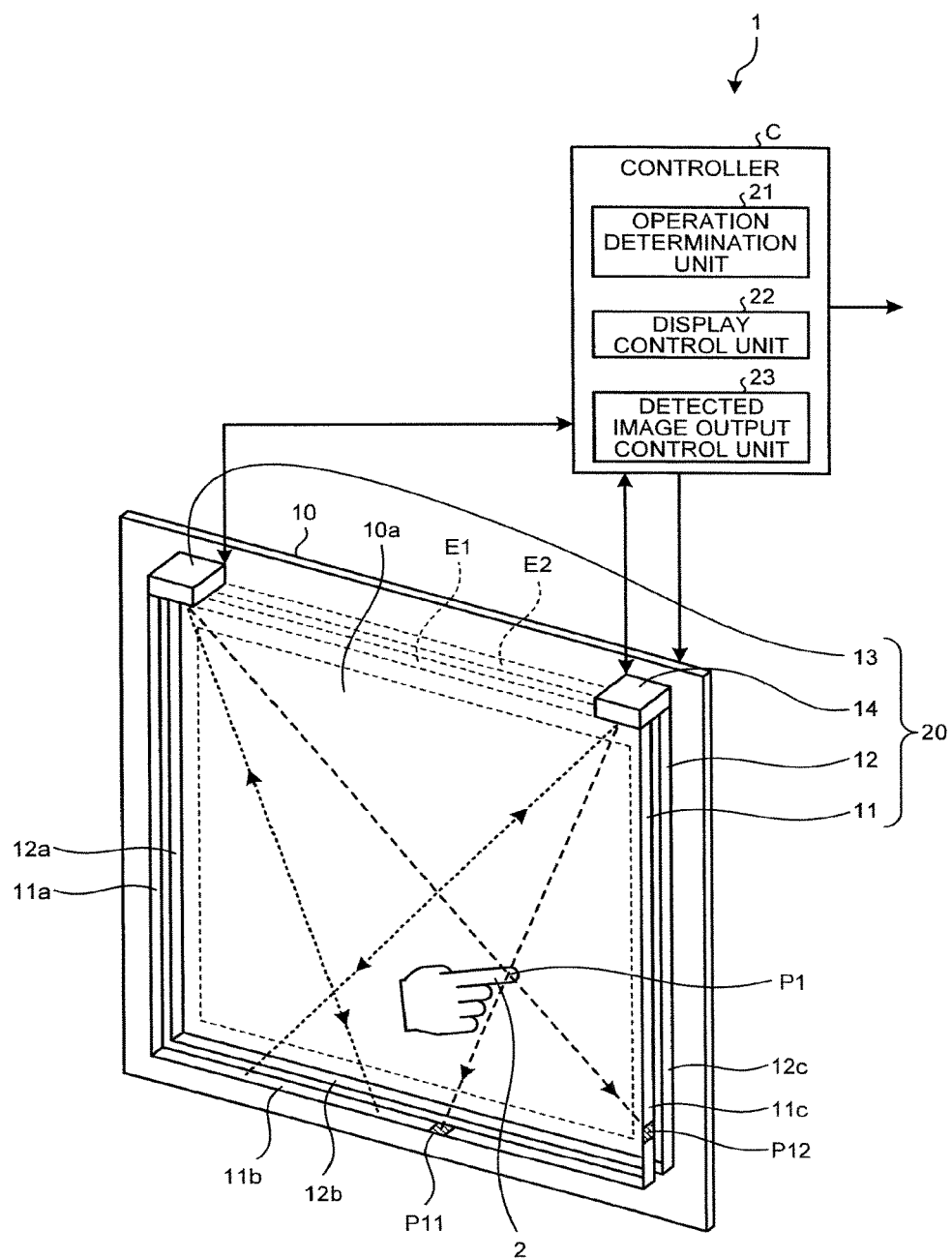
FIG. 13 is a schematic diagram illustrating a configuration of a controller of the optical operating input detection apparatus illustrated in FIG. 1, in which a detected image output control unit is additionally included.

To achieve that end, the controller C includes a detected image output control unit 23 as illustrated in FIG. 13. When the strong extraneous incident light is present, the detected image output control unit 23 nullifies, in the difference-processed image, a portion corresponding to the bright area in which the strong extraneous incident light is present.

Figure 14:
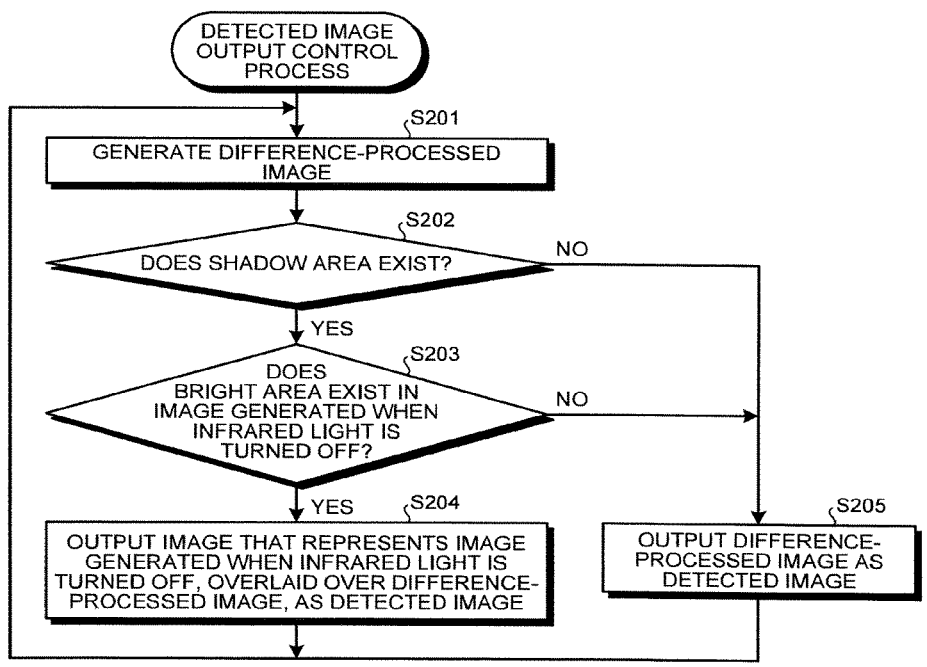
FIG. 14 is a flowchart illustrating a detected image output control process performed by the detected image output control unit illustrated in FIG. 13.

FIG. 14 is a flowchart illustrating a detected image output control process performed by the detected image output control unit 23. As illustrated in FIG. 14, the detected image output control unit 23 causes the left infrared ray irradiation part and the right infrared ray irradiation part of the left detector 13 and the right detector 14, respectively, to repeatedly turn on and off the infrared light and generates the difference-processed image that represents the image generated when the infrared light is turned off subtracted from the image generated when the infrared light is turned on (Step S201).

Figure 15:
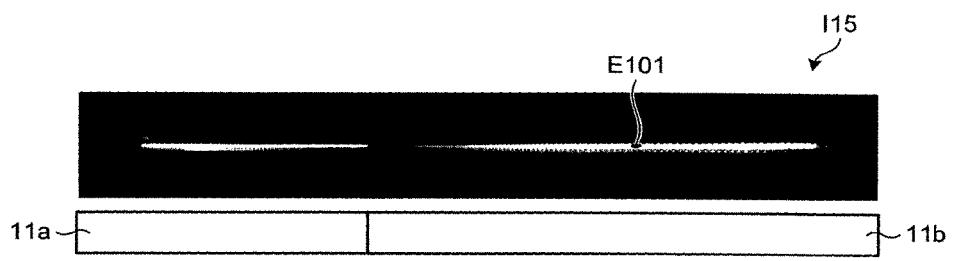
FIG. 15 is a diagram illustrating a difference-processed image of a left edge area and a lower edge area of the retroreflector, detected by the right detector.

The detected image output control unit 23 thereafter determines whether a shadow area having luminance equal to or lower than a lower limit threshold exists within the difference-processed image (Step S202). For example, FIG. 15 is a diagram illustrating a difference-processed image I15 of the left edge area 11*a* and the lower edge area 11*b* of the retroreflector 11, detected by the right detector 14. In the difference-processed image I15 illustrated in FIG. 15, a shadow area E101 having luminance equal to or lower than the lower limit threshold exists.

Figure 16:
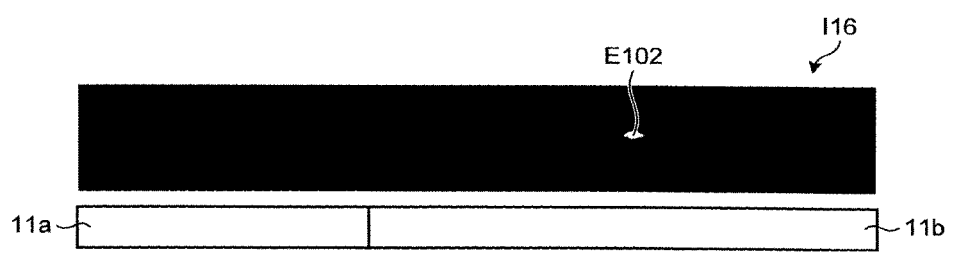
FIG. 16 is a diagram illustrating an image generated when infrared light is turned off of the left edge area and the lower edge area of the retroreflector, detected by the right detector.

If it is determined that the shadow area having luminance equal to or lower than the lower limit threshold exists within the difference-processed image (Yes at Step S202), it is further determined whether a bright area having luminance equal to or higher than an upper limit threshold exists in the image generated when the infrared light is turned off (Step S203). For example, FIG. 16 is a diagram illustrating an image I16 generated when the infrared light is turned off of the left edge area 11*a* and the lower edge area 11*b* of the retroreflector 11, detected by the right detector 14. In the image I16 generated when the infrared light is turned off illustrated in FIG. 16, a bright area E102 having luminance equal to or higher than the upper limit threshold exists, which means that the strong extraneous incident light is present.

Figure 17:
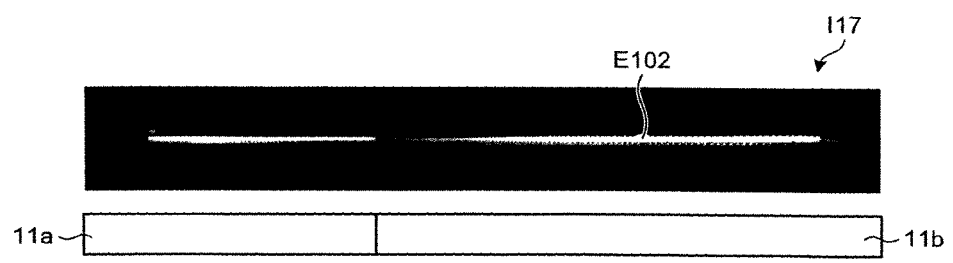
FIG. 17 is a diagram illustrating an overlay image of the left edge area and the lower edge area of the retroreflector, detected by the right detector.

If it is determined that the bright area having luminance equal to or higher than the upper limit threshold exists in the image generated when the infrared light is turned off (Yes at Step S203), an image that represents the image generated when the infrared light is turned off, overlaid over the difference-processed image generated at Step S201 is output as the detected image to the operation determination unit 21 (Step S204). Thereafter, the process returns to Step S201 and the above-described steps are repeated. FIG. 17 is a diagram illustrating an overlay image I17 that represents the image I16 generated when the infrared light is turned off illustrated in FIG. 16, overlaid over the difference-processed image I15 illustrated in FIG. 15. At Step S204, the overlay image I17 illustrated in FIG. 17 is generated and the shadow area E101 in the difference-processed image I15 existing at a portion corresponding to the bright area E102 in which the strong extraneous incident light is present is nullified. The detected image output control unit 23 then outputs the overlay image I17 as the detected image to the operation determination unit 21.

If it is determined that the shadow area having luminance equal to or lower than the lower limit threshold does not exist within the difference-processed image (No at Step S202), or if it is determined that the bright area having luminance equal to or higher than the upper limit threshold does not exist in the image generated when the infrared light is turned off (No at Step S203), it is then determined that the strong extraneous incident light is not present. The detected image output control unit 23 outputs to the operation determination unit 21 the difference-processed image generated at Step S201 as is as the detected image (Step S205) and proceeds to Step S201 to repeat the above-described steps.

The operation determination unit 21 performs the determination steps of Step S101 and Step S105 illustrated in FIG. 6 on the basis of the detected image input thereto.

Even when the strong extraneous incident light is present, for example, in an outdoor environment, the above-described detected image output control process nullifies the shadow area E101 caused by the strong extraneous incident light, so that false detection of the operating unit 2 can be reduced.

First Modification of Detected Image Output Control Process

The detected image output control process described above generates the overlay image that represents the image generated when the infrared light is turned off, overlaid over the difference-processed image to thereby nullify the shadow area caused by the strong extraneous incident light. In a first modification, neither the determination step to determine whether a shadow area exists, nor the determination step to determine whether a bright area exists in the image generated when the infrared light is turned off, is performed, although both are to be performed to nullify the shadow area caused by the strong extraneous incident light. Instead of performing these determination steps, in the first modification, the overlaying step is performed each time a difference-processed image is generated to overlay the once acquired image generated when the infrared light is turned off over the difference-processed image until a predetermined period of time elapses.

Figure 18:
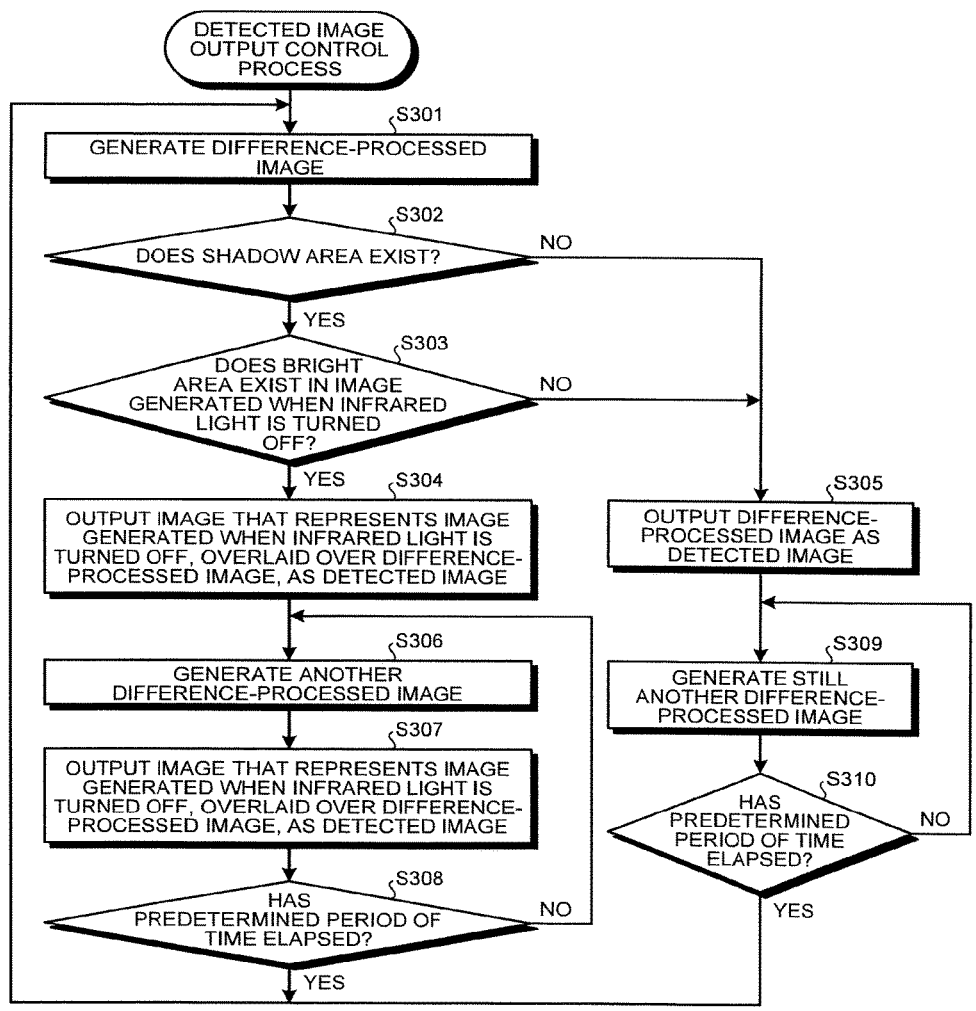
FIG. 18 is a flowchart illustrating a detected image output control process performed by the detected image output control unit illustrated in FIG. 13 according to a first modification.

FIG. 18 is a flowchart illustrating a detected image output control process performed by the detected image output control unit 23 in the first modification. Steps from Step S301 to Step S305 out of the process illustrated in FIG. 18 are the same as those of Step S201 to Step S205 illustrated in FIG. 14. The process according to the first modification, after having performed Step S304, generates another difference-processed image (Step S306), instead of performing Step S301. Thereafter, as at Step S304, an overlay image that represents the once acquired image generated when the infrared light is turned off, overlaid over the newly generated difference-processed image is output as the detected image to the operation determination unit 21 (Step S307). Thereafter, it is determined whether a predetermined period of time, e.g., 2 seconds, has elapsed (Step S308). If it is determined that the predetermined period of time is yet to elapse (No at Step S308), Step S306 is performed and an overlay image is output as the detected image each time a difference-processed image is generated. If it is determined that the predetermined period of time has elapsed (Yes at Step S308), Step S301 is performed and the above-described process is performed from the beginning.

After having performed Step S305, Step S301 is not performed and, instead, still another difference-processed image is generated (Step S309). Thereafter, it is determined whether a predetermined period of time, e.g., 2 seconds, has elapsed (Step S310). If it is determined that the predetermined period of time is yet to elapse (No at Step S310), Step S309 is performed. If it is determined that the predetermined period of time has elapsed (Yes at Step S310), Step S301 is performed and the above-described process is performed from the beginning.

Second Modification of Detected Image Output Control Process

In the detected image output control process and the first modification described above, the overlay image that represents the image generated when the infrared light is turned off, overlaid over the difference-processed image, is generated in order to nullify the shadow area, within the difference-processed image, corresponding to the bright area caused by the strong extraneous incident light in the image generated when the infrared light is turned off. In a second modification, an image to which nullification information is added is output as the detected image, in which the nullification information nullifies the shadow area, within the difference-processed image, corresponding to the bright area in the image generated when the infrared light is turned off.

Figure 19:
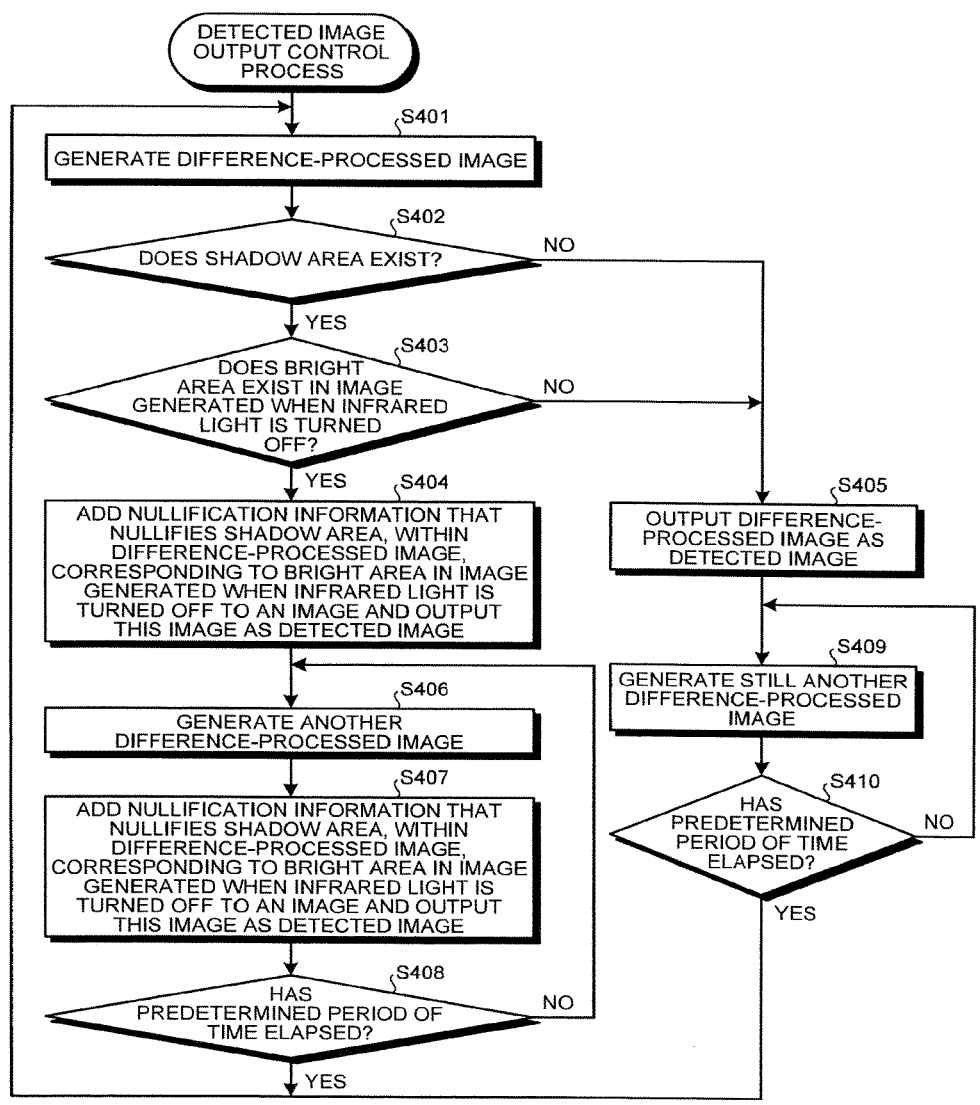
FIG. 19 is a flowchart illustrating a detected image output control process performed by the detected image output control unit illustrated in FIG. 13 according to a second modification.

FIG. 19 is a flowchart illustrating a detected image output control process performed by the detected image output control unit 23 according to the second modification. Steps from Step S401 to Step S403, Step S405, Step S409, and Step S410 out of the process illustrated in FIG. 19 are the same as those of Step S301 to Step S303, Step S305, Step S309, and Step S310 illustrated in FIG. 18. In the second modification, at Step S404 that corresponds to Step S304, nullification information that nullifies the shadow area, within the difference-processed image, corresponding to the bright area in the image generated when the infrared light is turned off is added to an image and the image is output as the detected image to the operation determination unit 21.

The process according to the second modification, after having performed Step S404, generates another difference-processed image (Step S406), instead of performing Step S401. Thereafter, as at Step S404, an image that represents the newly generated difference-processed image to which the once acquired nullification information is added is output as the detected image to the operation determination unit 21 (Step S407). Thereafter, it is determined whether a predetermined period of time, e.g., 2 seconds, has elapsed (Step S408). If it is determined that the predetermined period of time is yet to elapse (No at Step S408), Step S406 is performed and, each time a difference-processed image is generated, an image that represents the newly generated difference-processed image to which the nullification information is added is output. If it is determined that the predetermined period of time has elapsed (Yes at Step S408), Step S401 is performed and the above-described process is performed from the beginning.

Third Modification of Detected Image Output Control Process

In the detected image output control process and the first and second modifications described above, to generate a difference-processed image, the detected image output control unit 23 causes the left infrared ray irradiation part and the right infrared ray irradiation part of the left detector 13 and the right detector 14, respectively, to repeatedly turn on and off the infrared light and generates the difference-processed image that represents the image generated when the infrared light is turned off subtracted from the image generated when the infrared light is turned on. In a third modification, each of the left infrared ray detection part and the right infrared ray detection part is an image sensor that includes an infrared ray detection cell that detects infrared rays and a visible ray detection cell adjacent to the infrared ray detection cell. An amount of received light detected by the visible ray detection cell is weighted and the weighted amount of received light is subtracted from an amount of received light detected simultaneously by the infrared ray detection cell, to thereby a difference-processed image representing reception of the infrared rays only is generated. This approach is taken for the following reason. Specifically, because the infrared ray detection cell has sensitivity covering up to a visible light region, the amount of received light corresponding to the amount of received light detected by the visible ray detection cell is subtracted from the amount of light received by the infrared ray detection cell, so that the amount of received light of only the infrared rays emitted by the left infrared ray irradiation part and the right infrared ray irradiation part can be accurately detected.

Figure 20:
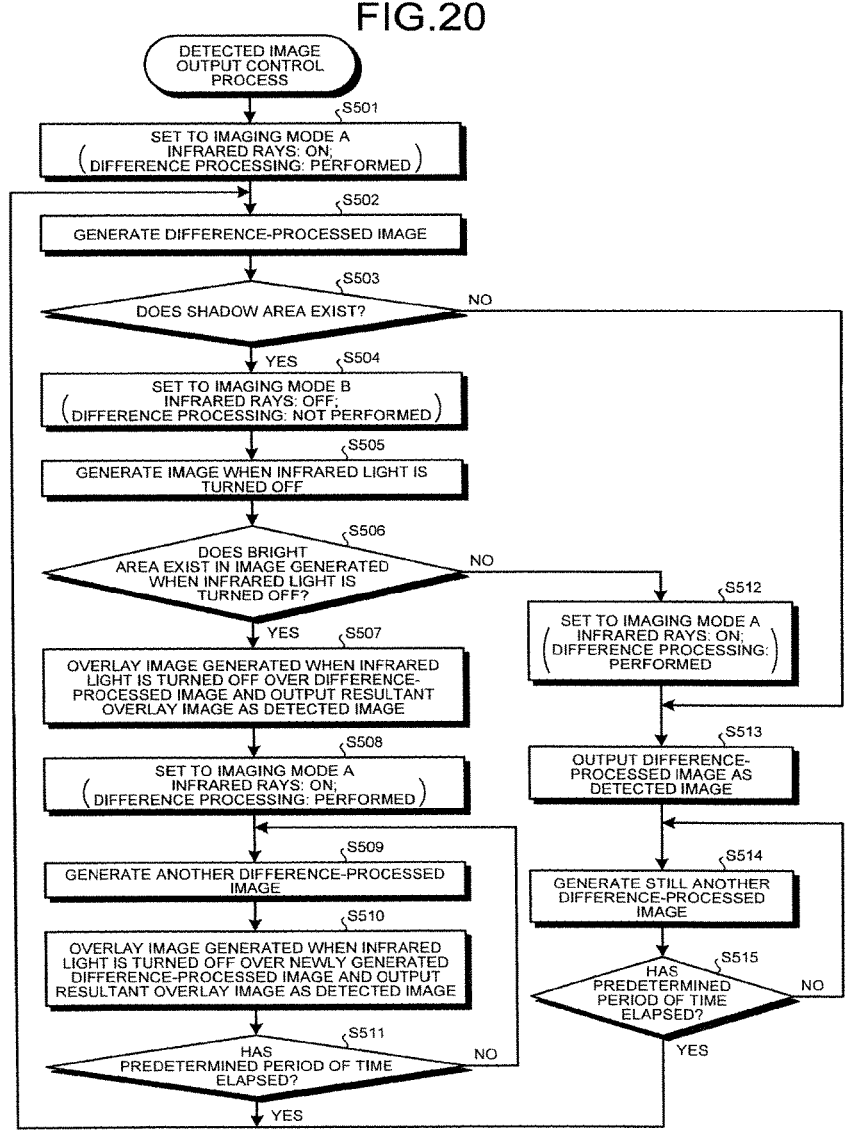
FIG. 20 is a flowchart illustrating a detected image output control process performed by the detected image output control unit illustrated in FIG. 13 according to a third modification.

FIG. 20 is a flowchart illustrating a detected image output control process performed by the detected image output control unit 23 according to the third modification. As illustrated in FIG. 20, the detected image output control unit 23 first sets an imaging mode of the left detector 13 and the right detector 14 to "imaging mode A" (Step S501). In imaging mode A, infrared rays are turned on and difference processing is performed. Thereafter, the amount of received light detected by the visible ray detection cell is weighted and the weighted amount of received light is subtracted from the amount of received light detected by the infrared ray detection cell to thereby generate a difference-processed image (Step S502).

Thereafter, the detected image output control unit 23 determines whether a shadow area having luminance equal to or lower than the lower limit threshold exists within the difference-processed image (Step S503). If it is determined that the shadow area having luminance equal to or lower than the lower limit threshold exists within the difference-processed image (Yes at Step S503), the imaging mode of the left detector 13 and the right detector 14 is set to "imaging mode B" (Step S504). In imaging mode B, infrared rays are turned off and difference processing is not performed. Thereafter, in imaging mode B, an image generated when the infrared light is turned off, detected by the infrared ray detection cell is generated (Step S505). It is further determined whether a bright area having luminance equal to or higher than the upper limit threshold exists within the image generated when the infrared light is turned off (Step S506).

If it is determined that the bright area having luminance equal to or higher than the upper limit threshold exists within the image generated when the infrared light is turned off (Yes at Step S506), then the image generated when the infrared light is turned off generated at Step S505 is overlaid over the difference-processed image generated at Step S502 and the resultant overlay image is output as the detected image to the operation determination unit 21 (Step S507).

The imaging mode is thereafter set to "imaging mode A" (Step S508) and another difference-processed image is generated (Step S509). Thereafter, as at Step S507, an overlay image that represents the once acquired image generated when the infrared light is turned off, overlaid over the newly generated difference-processed image is output as the detected image to the operation determination unit 21 (Step S510). It is then determined whether a predetermined period of time, e.g., 2 seconds, has elapsed (Step S511). If it is determined that the predetermined period of time is yet to elapse (No at Step S511), Step S509 is performed and an overlay image is output as the detected image each time a difference-processed image is generated. If it is determined that the predetermined period of time has elapsed (Yes at Step S511), Step S502 is performed and the above-described process is performed from the beginning.

If it is determined that the shadow area having luminance equal to or lower than the lower limit threshold does not exist within the difference-processed image (No at Step S503), or if it is determined that the bright area having luminance equal to or higher than the upper limit threshold does not exist within the image generated when the infrared light is turned off (No at Step S506), the imaging mode is set to "imaging mode A" (Step S512) and the difference-processed image generated at Step S502 is directly output as is as the detected image to the operation determination unit 21 (Step S513).

Still another difference-processed image is thereafter generated (Step S514). It is thereafter determined whether a predetermined period of time, e.g., 2 seconds, has elapsed (Step S515). If it is determined that the predetermined period of time is yet to elapse (No at Step S515), Step S514 is performed. If it is determined that the predetermined period of time has elapsed (Yes at Step S515), Step S502 is performed and the above-described process is performed from the beginning.

Even when the strong extraneous incident light is present, for example, in an outdoor environment, the above-described detected image output control process according to the third modification also nullifies the shadow area caused by the strong extraneous incident light, so that false detection of the operating unit 2 can be reduced.

It should be noted that process elements in FIGS. 14, and 18 to 20 can be combined as appropriate.

Application to Automatic Vending Machine

The following describes an exemplary application of the optical operating input detection apparatus 1 described above to an automatic vending machine. Although the automatic vending machine to be described hereunder sells commodities, such as canned beverages, bottled beverages, and PET-bottled beverages, this is illustrative only and not limiting. The optical operating input detection apparatus 1 may also be applied to an automatic vending machine that sells drinks served in cup or other types of commodities.

Figure 21:
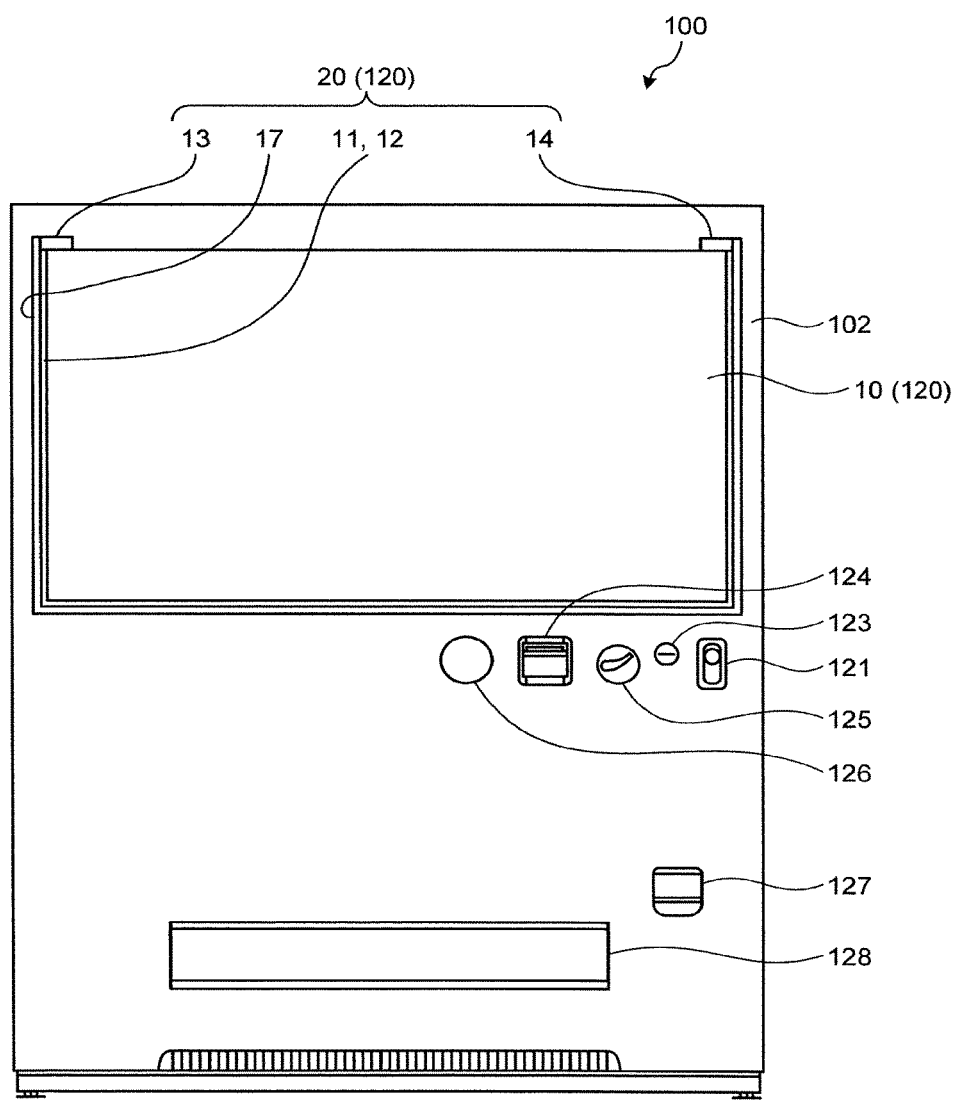
FIG. 21 is a front elevational view illustrating an appearance of an automatic vending machine to which the optical operating input detection apparatus according to the present disclosure is applied.
Figure 22:
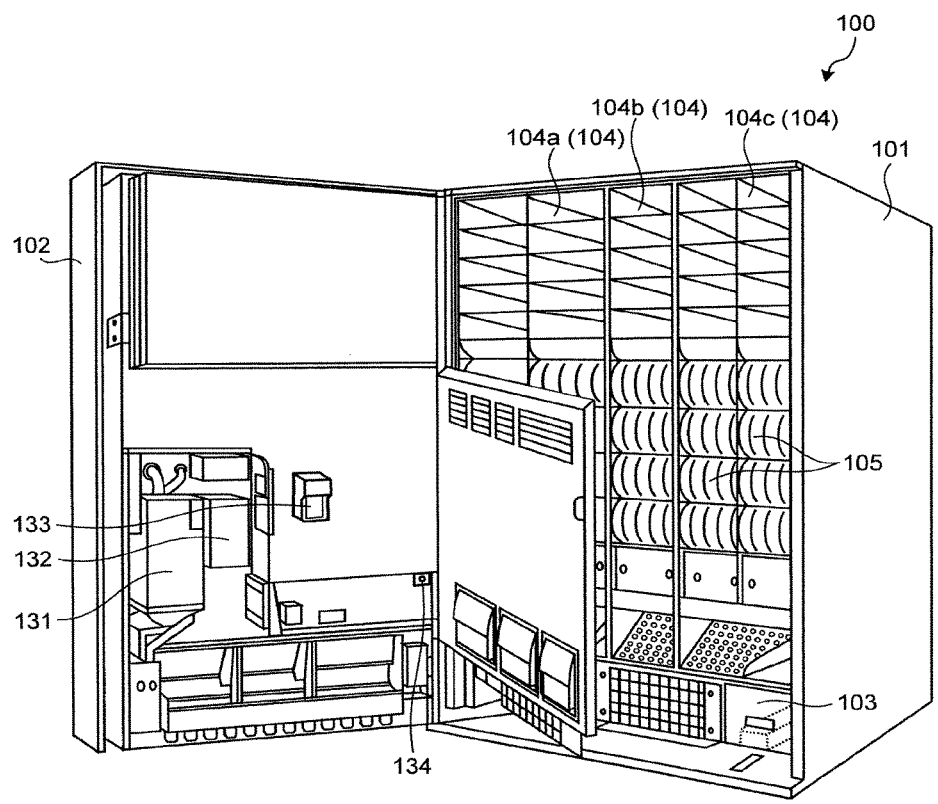
FIG. 22 is a perspective view illustrating an internal configuration of the automatic vending machine illustrated in FIG. 21.
Figure 23:
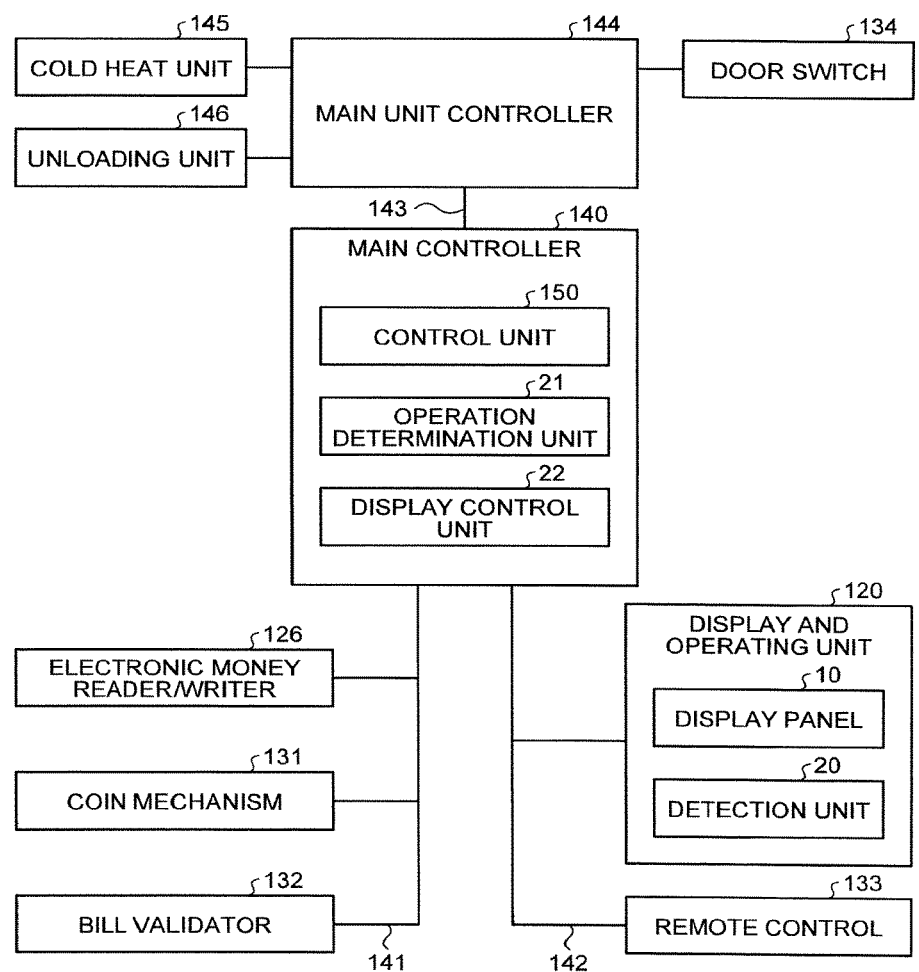
FIG. 23 is a block diagram illustrating a control configuration of the automatic vending machine illustrated in FIG. 21.

FIG. 21 is a front elevational view illustrating an appearance of an automatic vending machine to which the optical operating input detection apparatus 1 according to the present disclosure is applied. FIG. 22 is a perspective view illustrating an internal configuration of the automatic vending machine illustrated in FIG. 21. FIG. 23 is a block diagram illustrating a control configuration of the automatic vending machine illustrated in FIG. 21.

This automatic vending machine 100 sells commodities, such as canned beverages, bottled beverages, and PET-bottled beverages. As illustrated in FIG. 22, the automatic vending machine 100 includes a main cabinet 101. The main cabinet 101 combines a plurality of steel plates as appropriate to be formed into a box having an open front surface. The main cabinet 101 thus has the front opening closed by an openable exterior door 102.

The main cabinet 101 has an internal space defining a machine chamber 103 and a commodity housing chamber 104. The commodity housing chamber 104 is further partitioned by heat insulating partition plates into three commodity storages 104a, 104b, and 104c. Of the commodity storages 104a, 104b, and 104c, the left commodity storage 104a on the observer's left side (hereinafter referred to as a "left storage") and the middle commodity storage 104b (hereinafter referred to as a "middle storage") permit selection between cooling and warming. When the commodity storage 104a (104b) is set to cooling, the interior of the commodity storage 104a (104b) is cooled to cool the commodity stored in the commodity storage 104a (104b). When the commodity storage 104a (104b) is set to warming, the interior of the commodity storage 104a (104b) is warmed to warm the commodity stored in the commodity storage 104a (104b). Additionally, the right commodity storage 104c on the observer's right side (hereinafter referred to as a "right storage") is dedicated to cooling and the interior of the commodity storage 104c is cooled to cool the commodity stored in the commodity storage 104c.

A commodity storage rack 105 is mounted on each of the commodity storages 104a, 104b, and 104c. The automatic vending machine 100 includes two rows of the commodity storage rack 105 in a width direction of each of the left storage 104a and the right storage 104c and one row of the commodity storage rack 105 in the width direction of the middle storage 104b. In addition, the commodity storage rack 105 includes five passages (hereinafter referred to as "racks" for convenience sake) arrayed in a depth direction of the commodity storages 104a, 104b, and 104c. Commodities can be stored in each of these passages.

Reference is made to FIG. 21. A main door lock 121 is disposed in the middle on the right-hand side of a front surface of the exterior door 102. The main door lock 121 is locked under a condition in which the exterior door 102 is closed. Additionally, the exterior door 102 further includes a display and operating unit 120 (see FIG. 23) disposed at a superior part on the front surface thereof. The display and operating unit 120 combines a large-sized display panel 10 with the detection unit 20. The display and operating unit 120 displays sales display screens (see FIGS. 7 to 11). The sales display screens each display commodities to be sold and a specific commodity is selected through operations involving at least two stages as described previously. It is noted that, as described previously, the first detection layer E1 and the second detection layer E2 of the detection unit 20 are disposed so as to cover an area of the sales display screen of the display panel 10. Additionally, the display panel 10 displays such messages as "for sale", "out of change", "standby", and "no bills acceptable", in addition to various other types of information including the amount of money inserted.

The exterior door 102 further has a coin slot 123, a bill insertion port 124, a return lever 125, and an electronic money reader/writer 126 disposed in the middle thereof below the display and operating unit 120.

The coin slot 123 is an opening through which coins are received. The coin thrown in through the coin slot 123 is housed in a coin mechanism (coin processor) 131 (see FIG. 23) mounted on the inside of the exterior door 102. The coin mechanism 131 keeps track of the numbers of various types of coins thrown in and transmits the data to a main controller 140 (see FIG. 23) to be described later. In addition, the coin mechanism 131 delivers various types of coins in accordance with a command from the main controller 140. The coin mechanism 131 mounted in the automatic vending machine 100 is provided with a self-monitoring function to monitor conditions of the coin mechanism 131. When a cassette tube (not illustrated), in which coins are stored, is removed or an inventory switch (not illustrated) is operated in order to recover coins stored thereinside, the coin mechanism 131 transmits the operation (an operating input to recover coins) to the main controller 140 to be described later.

The bill insertion port 124 is an opening through which bills are received. A bill inserted through the bill insertion port 124 is stored in a bill validator (bill processor) 132 (see FIG. 22) mounted on the inside of the exterior door 102. The bill validator 132 keeps track of the numbers of various types of bills inserted and transmits the data to the main controller 140 (see FIG. 23). In addition, the bill validator 132 delivers various types of bills in accordance with a command from the main controller 140. The bill validator 132 mounted in the automatic vending machine 100 is provided with a self-monitoring function to monitor conditions of the bill validator 132. When an operation is performed to open a stacker (not illustrated), in which bills are stored, in order to recover bills stored thereinside, the bill validator 132 transmits the operation (an operating input to recover bills) to the main controller 140 to be described later.

The return lever 125 instructs interruption of a transaction. Operation of the return lever 125 interrupts the transaction and change or the like is discharged to a return port 127. The electronic money reader/writer 126 identifies a card and makes payment through electronic money charged to the card.

The exterior door 102 further has a takeout port 128 at a lower portion thereof. The takeout port 128 is an opening through which a commodity unloaded from the commodity storage rack 105 can be retrieved.

A remote control 133 is disposed on the inside of the exterior door 102. The remote control 133 allows various operations to be performed, including operations to make settings and to confirm various types of sales data. The remote control 133 includes an operating key, a cooling/warming selector switch, and a monitor (liquid crystal character display) on which various types of setup data and confirmation data are displayed. The setup data input from the remote control 133 is transmitted to the main controller 140 and the confirmation data transmitted from the main controller 140 is received by the remote control 133. In addition, the automatic vending machine 100 includes an operating key (replenishing operating key) to be operated when commodities are to be added (loaded). Operating this operating key causes the remote control 133 to transmit the operation (an operating input to replenish the supply of commodities) to the main controller 140 to be described later.

A door switch 134 is disposed on the inside of the exterior door 102. The door switch 134 detects an open or closed position of the exterior door 102. The door switch 134 is turned on when the exterior door 102 is open and is turned off when the exterior door 102 is closed.

Reference is made to FIG. 23. The coin mechanism 131, the bill validator 132, and the electronic money reader/writer 126 are connected with the main controller (main control unit) 140 via a line 141. The display and operating unit 120 (the display panel 10 and the detection unit 20) and the remote control 133 are connected with the main controller 140 via a line 142. A main unit controller 144 is connected with the main controller 140 via a line 143.

A cold heat unit 145 and an unloading unit 146, in addition to the abovementioned door switch 134, are connected with the main unit controller 144. The main unit controller 144 controls the cold heat unit 145 and the unloading unit 146 in accordance with instructions from the main controller 140.

The cold heat unit 145 controls to maintain the commodity storages 104a, 104b, and 104c in set conditions. The cold heat unit 145 cools the interior of a commodity storage that has been set to cooling, while warming the interior of a commodity storage that has been set to warming.

The unloading unit 146 controls a vend solenoid and a sold-out switch provided for each rack. In accordance with an unloading command transmitted from the main controller 140 to the main unit controller 144, the unloading unit 146 unloads a commodity from the rack. When having unloaded all commodities stored in the rack, the unloading unit 146 outputs a sold-out signal to the main unit controller 144.

As illustrated in FIG. 23, the main controller 140 includes a control unit 150, the operation determination unit 21, and the display control unit 22.

The control unit 150 centrally controls, for example, the electronic money reader/writer 126, the coin mechanism 131, the bill validator 132, the display and operating unit 120 (the display panel 10 and the detection unit 20), the remote control 133, and the main unit controller 144 on the basis of the various types of setup data stored in a storage not illustrated.

The operation determination unit 21 and the display control unit 22 perform processing in accordance with the process illustrated in FIG. 6 as described previously. When the operation determination unit 21 determines on the basis of a detection result of the detection unit 20 that a decision-making operation with respect to, for example, a commodity has been made through a contact operation by the operating unit 2, the main controller 140 performs cash processing on the basis of information of the electronic money reader/writer 126, the coin mechanism 131, and the bill validator 132 and performs via the main unit controller 144 unloading processing for the commodity corresponding to the position at which the decision-making operation has been performed.

Detection Area of Detection Unit in Automatic Vending Machine

Figure 24:
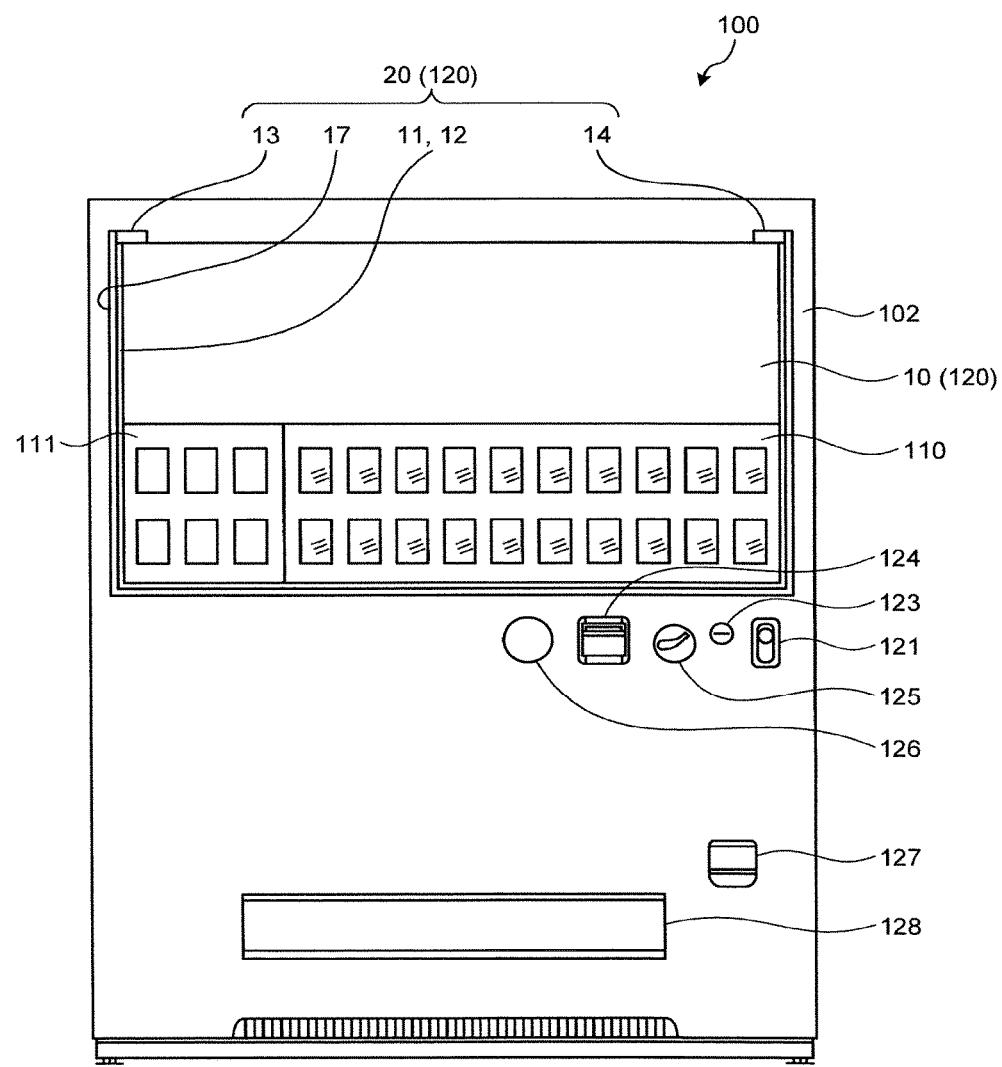
FIG. 24 is a diagram illustrating a configuration of an exterior door front surface when a detection area of the detection unit covers a front surface of a display panel, a front surface of a dummy commodity exhibition portion, and a front surface of a planar commodity display portion.

The automatic vending machine 100 depicted in FIG. 21 includes the detection unit 20 having the detection area covering only the large-sized display panel 10 such as a liquid crystal panel. The detection unit 20 may nonetheless be configured, as illustrated in FIG. 24, to include, in addition to the front surface of the display panel 10, a front surface of a dummy commodity exhibition portion 110 exhibiting three-dimensional commodity dummies and a front surface of a planar commodity display portion 111 on which commodities are planarly drawn in the detection area. Alternatively, the detection area of the detection unit 20 may be a combination of any one or more of the front surface of the display panel 10, the front surface of the dummy commodity exhibition portion 110, and the front surface of the planar commodity display portion 111. It is noted that, when the detection area is to cover the front surface of the dummy commodity exhibition portion 110 and the front surface of the planar commodity display portion 111, the guidance display may be displayed on the display panel 10 or voice guidance may be given for a right purchase.

Unlike the known resistance film type or capacitive coupling type touch panel, the detection unit 20 does not require a touch sensor or protective film affixed to the surface of the display panel 10. This feature allows any area of the front surface of each of the different types of display portions (the display panel 10, the dummy commodity exhibition portion 110, and the planar commodity display portion 111) to readily serve as the detection area.

As described above, in the present disclosure, the detection unit optically detects an operating input by the operating unit on the first detection layer and on the second detection layer. The first detection layer extends in parallel with, and is spaced a predetermined distance away from, the display area surface on the display panel and has a surface area including the display area surface. The second detection layer is disposed between the display area surface and the first detection layer and has the surface area identical to the surface area of the first detection layer. The operation determination unit determines operating detail of the operating unit using detected images on the first detection layer and the second detection layer. The foregoing arrangements enable detection of the operating unit at two different distance stages on the front surface of the display panel, so that false operations involved in the operating unit erroneously touching the touch panel can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical operating input detection apparatus for optically detecting an operating input on a display panel by an operating unit, the optical operating input detection apparatus comprising:
   a detection unit configured to optically detect an operating input by the operating unit on respective first and second detection layers, the first detection layer extending in parallel with a display area surface on the display panel to be spaced a predetermined distance away from the display area surface and having a surface area located above a portion of the display area surface, the second detection layer being disposed between the display area surface and the first detection layer and having a surface area identical to the surface area of the first detection layer, the detection unit including a first retroreflector disposed on an edge of the first detection layer and a second retroreflector disposed on an edge of the second detection layer; and
   an operation determination unit configured to determine operating detail of the operating unit based on a detected image on the respective first and second detection layers,
   wherein
   the surface areas of the first and second detection layers of the detection unit are rectangular,
   the first retroreflector is disposed on right and left edges and lower edges of the first detection layer,
   the second retroreflector is disposed on right and left edges and lower edges of the second detection layer, and
   the detection unit includes
      a left detector disposed at left ends of upper edges of the rectangular surface areas, the left detector including a left infrared ray irradiation part configured to irradiate the right edges and the lower edges of the retroreflectors with infrared rays and a left infrared ray detection part configured to detect infrared ray reflection light from the right edges and the lower edges of the retroreflectors; and
      a right detector disposed at right ends of the upper edges of the rectangular surface areas, the right detector including a right infrared ray irradiation part configured to irradiate the left edges and the lower edges of the retroreflectors with infrared rays and a right infrared ray detection part configured to detect infrared ray reflection light from the left edges and the lower edges of the retroreflectors.

2. The optical operating input detection apparatus according to claim 1, wherein the operation determination unit is configured to, based upon detecting the operating unit on the first detection layer and further detecting the operating unit on the second detection layer at a planar position identical to a planar position detected the operating unit on the first detection layer, determine that a contact operation at the planar position has been performed by the operating unit.

3. The optical operating input detection apparatus according to claim 1, further comprising:
   a display control unit configured to display, on the display panel, an image corresponding to the operating input by the operating unit on the respective first and second detection layers.

4. The optical operating input detection apparatus according to claim 3, wherein the display control unit is configured to, based upon detecting the operating unit on the first detection layer, display, on the display panel, an image indicative of a position on the first detection layer at which the operating unit points such that the image follows movement of the operating unit.

5. The optical operating input detection apparatus according to claim 3, wherein the display control unit is configured to, based upon detecting the operating unit on the first detection layer, display, on the display panel, information that corresponds to a position of the operating unit on the first detection layer.

6. The optical operating input detection apparatus according to claim 1, wherein the operation determination unit is configured to identify the operating unit based on the detected image on the respective first and second detection layers.

7. The optical operating input detection apparatus according to claim 1, wherein the retroreflectors are a group of corner cube prisms.

8. An automatic vending machine comprising:
   the optical operating input detection apparatus recited in claim 1,
   wherein the detection unit is disposed on an exterior door of the automatic vending machine.

9. The automatic vending machine according to claim 8, wherein the detection unit includes any one of a display screen area and a dummy commodity exhibition area disposed on the exterior door of the automatic vending machine, and an exterior door surface area.

10. An optical operating input detection apparatus for optically detecting an operating input on a display panel by an operating unit, the optical operating input detection apparatus comprising:
    a detection unit configured to optically detect an operating input by the operating unit on respective first and second detection layers, the first detection layer extending in parallel with a display area surface on the display panel to be spaced a predetermined distance away from the display area surface and having a surface area located above a portion of the display area surface, the second detection layer being disposed between the display area surface and the first detection layer and having a surface area identical to the surface area of the first detection layer;
    an operation determination unit configured to determine operating detail of the operating unit based on a detected image on the respective first and second detection layers; and
    a detected image output control unit configured to:
       acquire a light-off image that is generated when light emitted by the detection unit is turned off; and when a bright area having luminance equal to or higher than a predetermined level exists in the light-off image, nullify a portion corresponding to the bright area within the detected image on the respective first and second detection layers to output a resultant image as the detected image.

11. The optical operating input detection apparatus according to claim 10, wherein the detected image output control unit is configured to:
   acquire a light-off image that is generated when light emitted by the detection unit is turned off; and
   when a bright area having luminance equal to or higher than a predetermined level exists in the light-off image, output as the detected image an overlay image that represents the light-off image overlaid over the detected image on the respective first and second detection layers to nullify a portion corresponding to the bright area.

12. An optical operating input detection method for optically detecting an operating input on a display panel by an operating unit, the optical operating input detection method comprising:
   optically detecting an operating input by the operating unit on respective first and second detection layers, the first detection layer extending in parallel with a display area surface on the display panel to be spaced a predetermined distance away from the display area surface on the display panel and having a surface area located above a portion of the display area surface, the second detection layer being disposed between the display area surface and the first detection layer and having a surface area identical to the surface area of the first detection layer;
   irradiating edges of a first retroreflector disposed on the first detection layer;
   irradiating edges of a second retroreflector disposed on the second detection layer; and
   determining operating detail of the operating unit based on a detected image on the respective first and second detection layers,
   the surface areas of the first and second detection layers of the detection unit being rectangular,
   the first retroreflector being disposed on right and left edges and lower edges of the first detection layer,
   the second retroreflector being disposed on right and left edges and lower edges of the second detection layer,
   a left detector being disposed at left ends of upper edges of the rectangular surface areas, the left detector including a left infrared ray irradiation part configured to irradiate the riqht edges and the lower edges of the retroreflectors with infrared rays and a left infrared ray detection part configured to detect infrared ray reflection light from the riqht edges and the lower edges of the retroreflectors, and
   a right detector being disposed at right ends of the upper edges of the rectangular surface areas, the right detector including a right infrared ray irradiation part configured to irradiate the left edges and the lower edges of the retroreflectors with infrared rays and a right infrared ray detection part configured to detect infrared ray reflection light from the left edges and the lower edges of the retroreflectors.

* * * * *

UNITED STATES PATENT AND TRADEMARK OFFICE
CERTIFICATE OF CORRECTION

PATENT NO. : 10,402,016 B2
APPLICATION NO. : 15/333706
DATED : September 3, 2019
INVENTOR(S) : Tomonori Maekawa et al.

It is certified that error appears in the above-identified patent and that said Letters Patent is hereby corrected as shown below:

In the Claims

Column 20, Line 17:
In Claim 12, delete "riqht" and insert --right--, therefor.

Column 20, Line 20:
In Claim 12, delete "riqht" and insert --right--, therefor.

Signed and Sealed this
Nineteenth Day of November, 2019

Andrei Iancu
*Director of the United States Patent and Trademark Office*